(12) United States Patent
Chang et al.

(10) Patent No.: US 7,028,111 B2
(45) Date of Patent: Apr. 11, 2006

(54) BUS SYSTEM AND BUS INTERFACE FOR CONNECTION TO A BUS

(75) Inventors: Yeow Khai Chang, Singapore (SG); Ying Zou, Irvine, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 427 days.

(21) Appl. No.: 10/254,225

(22) Filed: Sep. 25, 2002

(65) Prior Publication Data

US 2003/0101311 A1 May 29, 2003

(30) Foreign Application Priority Data

Sep. 28, 2001 (WO) .................... PCT/SG01/00196

(51) Int. Cl.
*G06F 13/14* (2006.01)
(52) U.S. Cl. ...................... 710/52; 710/56; 710/57; 710/305
(58) Field of Classification Search ............ 710/52–53, 710/56–57, 62, 105–106, 300, 305–306, 710/310, 313–314
See application file for complete search history.

(56) References Cited

U.S. PATENT DOCUMENTS

| 6,145,045 | A | * | 11/2000 | Falik et al. | ........... | 710/310 |
| 6,477,600 | B1 | * | 11/2002 | Baxter et al. | ........... | 710/260 |
| 6,745,264 | B1 | * | 6/2004 | Luke et al. | ........... | 710/52 |
| 6,757,763 | B1 | * | 6/2004 | Preiss et al. | ........... | 710/105 |

OTHER PUBLICATIONS

How USB Works, Tech-Pro.*

USB in a Nutshell, Beyond Logic.*

* cited by examiner

*Primary Examiner*—Khanh Dang
(74) *Attorney, Agent, or Firm*—Peter Zawilski

(57) ABSTRACT

The invention relates to a bus system comprising a first station (202) and a second station (203), (204), coupled by a bus for transferring messages, said bus being designed to operate in accordance with a protocol in which said first station (202) periodically sends messages in a predetermined order to the second station (203), (204), wherein said first station (202) comprises an interruptible processor (206), a memory element (208) comprising a buffer (501, 502), and a bus interface (207), wherein said interruptible processor (206) can be operated so as to generate a plurality of series of message properties;

wherein said processor (206) can further be operated so as to issue a first series of message properties from among said plurality of series of message properties to said buffer (501, 503), and upon receipt of an interrupt signal from said bus interface issues a second series of message properties from among said plurality of series of message properties;

wherein said buffer (501, 502) has a storage capacity, which is adjustable by the processor (206) and which is matched to store said first series of said message properties and said second series of said message properties; and wherein said bus interface (207) can be operated so as to retrieve said first series of message properties from said buffer, to generate a first series of said messages from said properties, to send said first series of said messages to said second station (203, 204), and to send said interrupt signal to said processor (206).

3 Claims, 5 Drawing Sheets

BUS SYSTEM AND BUS INTERFACE FOR CONNECTION TO A BUS

The invention relates to a bus system comprising a first station and a second station, coupled by a bus for transferring messages, said bus being designed to operate in accordance with a protocol in which said first station periodically sends messages in a predetermined order to the second station.

The invention also relates to a bus interface comprising a connection for a bus, an input for receiving a plurality of series of message properties from an interruptible processor, and an interrupt output for sending an interrupt signal to said processor.

Such a bus system is disclosed in the USB specification. The USB specification is a standard promulgated by a group of companies including Compaq Computer Corporation, Hewlett-Packard Company, Intel Corporation, Lucent Technologies Inc, Microsoft Corporation, NEC Corporation, and Koninklijke Philips Electronics N.V. Described below are various aspects of the USB relevant to a complete understanding of the present invention. Further background information concerning the USB may be obtained from USB Specification, Revision 2.0, which is included herein by reference.

The USB is a standard bus designed to support data exchange between a personal computer and a wide variety of peripherals: e.g. webcams, printers, scanners, microphones, and keyboards. The USB thus replaces existing interfaces such as the RS-232C serial ports, parallel ports, and PS/2 interfaces. Further developments of the USB, as in e.g. USB On-The-Go (USB OTG), aim at bus systems where another apparatus replaces the personal computer. Such an apparatus could be, for example, a digital still camera, a video camera, a personal digital assistant, or a cellular phone.

In a bus system like the USB system, electronic bus stations are connected with each other via a bus. Usually a bus station comprises a processor or computing system to process or generate data and to control the flow of data. USB stations are defined as hosts (e.g. personal computers) and as devices (peripherals). In general there is only one host in any USB system. A USB interface at the host is also referred to as a host controller. The host controller may be implemented in a combination of hardware, firmware, or software. USB devices are defined as hubs, which provide additional attachment points or functions, thus providing capabilities to the system. The devices are connected to the host via a tiered-star topology. Hubs indicate the attachment or removal of a USB device. The host determines whether a newly attached USB device is a hub or a function and assigns a unique USB address to the USB device. All USB devices are accessed by a unique USB address. Each device additionally supports one or more endpoints with which the host may communicate. The remaining description will be limited to USB devices defined as functions.

The USB is a polled bus. The host controller initiates all data transfers. Most bus transactions involve the transmission of up to three packets. Each transaction begins when the host controller, on a scheduled basis, sends a USB packet describing the type and direction of the transaction, the USB device address, and endpoint number. This packet is referred to as the "token packet". The USB device that is addressed selects itself by decoding the appropriate address fields. In a given transaction, data is transferred either from the host to a device or from a device to the host. The direction of data transfer is specified in the token packet. The source of the transaction then sends a data packet or indicates it has no data to transfer. The destination, in general, responds with a handshake packet indicating whether the transfer was successful.

The USB architecture comprehends three basic types of data transfer: (1) isochronous transfers: periodic, continuous communication between host and device, typically used for time-relevant information, which occupies a pre-negotiated amount of USB bandwidth with a pre-negotiated latency; (2) interrupt transfers: low-frequency, bounded latency communication, typically used for asynchronous data such as characters or coordinates with human perceptible echo or feedback response characteristics, and; (3) bulk transfers: non-periodic, large-packet bursty communication, typically used for data that can use any available bandwidth and can also be delayed until bandwidth is available.

Usually both types of bus station, host and device, comprise a processor or computing system to either process or generate data, or to control the flow of data, or both. A straightforward implementation of a USB system as described above could lead to significant communication timing problems in the communication on the one hand between the processor and the bus interface of the host, and on the other hand between the bus interface of the host and a device. This holds especially for isochronous transfers. In these transfers, involving real-time data, the host periodically sends token packets to a USB device, every token packet being followed by transmission of a data packet either from the host to the USB device or vice versa. Due to the real-time nature of the data, communication between the processor of the host and the bus interface of the host has to be in line with the communication between the bus interface of the host and the USB device, otherwise data will be lost.

U.S. Pat. No. 6,145,045 discloses a partial solution to this problem, although it focuses on communication timing problems within a USB device during non-isochronous transfers. The patent discloses a bus station comprising a bus interface, a processor, a first buffer, and a second buffer. During a first (micro) frame, the processor communicates with the first buffer (e.g. reads or writes data), while the bus communicates with the second buffer and the first station to send data from the second buffer to the second station or to write data received from the second station into the second buffer. During a second (micro) frame following the first (micro) frame, the processor communicates with the second buffer (e.g. reads or writes data), while the bus communicates with the first buffer and the first station to send data from the second buffer to the second station or to write data received from the second station into the first buffer. Usually the bus interface interrupts the processor to notify the processor it should write new information into one of the buffers or read information from one of the buffers.

For USB systems in general and for USB OTG systems in particular, a bus interface in a bus station, e.g. a host, should preferably be able to co-operate with a wide range of processors and computing systems. However, a variety of processors that are otherwise suitable have a relatively long interrupt response time, which would result in lost or corrupted data if they were used as processors in a bus station, e.g. a host.

It is amongst the objects of the invention to increase the flexibility in communication timing between a processor and a bus interface within a first station of a bus system, comprising a first station and a second station.

To this end, the invention provides a bus system as defined in the opening paragraph which is characterized in that said first station comprises an interruptible processor, a memory element comprising a buffer, and a bus interface, wherein said interruptible processor can be operated so as to generate a plurality of series of message properties;

wherein said processor can further be operated so as to issue a first series of message properties from among said plurality of series of message properties to said buffer, and upon receipt of an interrupt signal from said bus interface to issue a second series of message properties from among said plurality of series of message properties;

wherein said buffer has a storage capacity that is adjustable by the processor such that it is matched to store said first series of said message properties and said second series of said message properties; and wherein said bus interface can be operated so as to retrieve said first series of message properties from said buffer, to generate a first series of said messages properties from said message properties, to send said first series of said messages to said second station, and to send said interrupt signal to said processor.

In operation the processor within said first station needs to provide information on a real-time basis to said second station. To this purpose said processor needs to provide said message properties to said bus interface. Said bus interface generates a message from said message properties and sends it to said second station.

In a conventional approach, said bus interface would send first message properties to said bus interface or to a buffer associated with said bus interface. Then said bus interface will, if necessary, retrieve said first message properties from said buffer, generate a first message from said first message properties, and send said first message to said second station. By the time said bus interface need second message properties, it will send an interrupt signal to said processor. Hereafter said processor will respond by sending said second message properties to said buffer or said bus interface. Finally, said bus interface will, if necessary retrieve said second message properties from said buffer, generate a second message from said second message properties, and send said second message to said second station.

If there is a long latency between said sending of said interrupt signal to said processor and said sending of said second message properties, in other words if said processor would have a long interrupt response time, said latency could have as a result that said second message properties arrive too late at said bus interface with missed or corrupted data as a consequence. Such a processor could otherwise be very well suited for use within the bus system. Thus the conventional approach limits the choice in processors due to strict requirements on interrupt response times.

By allowing said processor to issue in advance a series of message properties instead of message properties for a single message upon receiving an interrupt signal from said bus interface, said processor has sufficient time to respond and the disadvantage of a long interrupt response time is circumvented. By having the processor adjust the storage capacity of said buffer to its own needs, said bus interface can co-operate with a large variety of processors and it is ensured that the storage capacity of said buffers is not chosen unnecessarily large. The result is a buffer with a small storage capacity for storing short series of message properties, or even just message properties for one of said messages, whenever possible, and a buffer with a large storage capacity for storing longer series of message properties when required. This increases the flexibility in communication timing between said processor and said bus interface within said first station of said bus system.

As an example, said processor could have information available on the quality of the data arriving at the second station, for example, comprising the number of detected errors. If said quality drops below a certain level, the processor could decide to increase said storage capacity of said buffer. Furthermore, if only buffers with a small storage capacity are required, more space could be assigned to other buffers for other purposes within said memory element.

An embodiment of the bus system according to the invention is characterized in that said memory element comprises a first buffer for storing said first series of message properties and a second buffer for storing said second series of message properties; and, said bus interface can be operated so as to retrieve said first series of message properties from said first buffer, while said processor issues said second series of message properties to said second buffer.

In the operation of this embodiment there is no direct chain in the communication between said processor, via said bus interface, to said second station. Said first series of message properties is sent to said first buffer according to the timing of a link between said processor and said first buffer. After that said second series of message properties is sent to said second buffer according to the timing of a link between said processor and said second buffer. Simultaneously said buffer periodically sends messages to said second station, which messages are generated from said first series of message properties stored in said first buffer. The only restriction on the timing of said link between said processor and said second buffer is that the transfer of said second series of message properties should be completed by the time said bus interface needs to retrieve message properties from among said second series of message properties.

A further embodiment of the bus system according to the invention is characterized in that said message properties comprise timing information and, if applicable, a payload. In this way the capabilities of the bus interface to decide on the correct timing of said messages without intervention of said processor are increased. Furthermore, the inclusion of said payload, which could comprise real time data, in said message properties, simplifies the communication between said processor and said bus interface because no additional communication link between the two is necessary for supplying said payload. Furthermore no additional processing by the bus interface is required to assign the correct real time data to the correct message.

A further embodiment of the bus system according to the invention is characterized in that said bus interface can be operated for periodically receiving messages with data items from the second station;

said bus interface can be further operated so as to extract said data items from said received messages, to extract timing information from said received messages, to compare said timing information with said timing information of said message properties from said first series of message properties stored in said buffer, and if said extracted timing information matches the timing information of said message properties from said first series of message properties stored in said buffer, to add said extracted data items to said payload; and said processor can be operated so as to retrieve said payload from said message properties from said first series of message properties stored in said buffer upon receipt of a further interrupt signal from said bus interface.

This embodiment simplifies communication between said processor and said bus interface in situations in which said processor requires real-time data from said second station. In this situation the processor preferably issues series of message properties without actual payloads. However, within said buffer said series of message properties are stored as if said message properties did comprise a payload. In this way space is reserved to add payloads to said message properties. Said payload is added by said bus interface. Said bus interface extracts timing information from said received messages and compares said extracted timing information with said timing information within said message properties. If it finds a match, said bus interface adds said extracted data items as a payload to said message properties. Then said processor retrieves said payloads of said message properties. Said processor retrieves said payloads preferably after receipt of a further interrupt signal from said bus interface. Thus no additional provisions are necessary to facilitate a transfer of real-time data from said second station to said processor.

A bus interface as defined in the second paragraph, according to the invention, is characterized in that said bus interface comprises a controller and a memory element comprising a buffer, wherein said buffer has a storage capacity which is adjustable by said processor and which is matched so as to store a first series of said message properties from among said plurality of series of message properties received from said processor and a second series of said message properties from among said plurality of series of message properties received from said processor after said processor has received an interrupt signal via said interrupt output;

wherein said controller can be operated so as to retrieve said first series of message properties from said buffer, to generate a first series of message properties from said first series of said message properties, to send said first series of message properties to said connection for said bus, and to send said interrupt signal to said processor.

An embodiment of the bus interface according to the invention is characterized in that said bus interface comprises a further buffer;

said further buffer can be operated so as to receive a storage capacity control item from said processor; and said controller can be operated so as to retrieve said storage capacity control item from said further buffer and, based on information contained within said storage capacity control item, can be operated so as to adjust said storage capacity.

This embodiment simplifies the communication between said processor and said bus interface. Said processor informs said bus interface of the storage capacity it requires. The bus interface handles the actual adjustment of said storage capacity. Such adjustments could even be made during operation, for example, if said processor detects that the quality of the real-time data arriving at said second station has dropped below a certain level.

These and other aspects of the invention will be apparent from and elucidated with reference to the embodiments described hereinafter.

In these Figures identical parts are identified with identical references.

Figure 1:
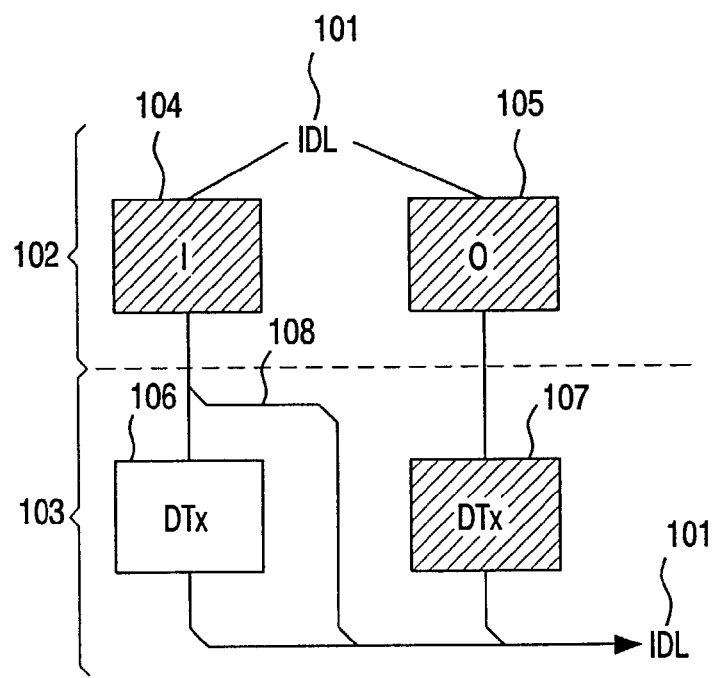
FIG. 1 is a diagram showing the isochronous transaction format as specified in the USB specification, revision 2.0.

FIG. 1 is a diagram showing the isochronous transaction format as specified in the USB specification, revision 2.0. Within USB all communication is initiated by the host. All USB devices are accessed by a unique USB address. Each device additionally supports one or more endpoints with which the host may communicate.

The USB supports functional data and control exchange between the USB host and USB devices. USB data transfers take place between host software and a particular endpoint on a USB device. The USB architecture comprehends three basic types of transfer:

isochronous transfers: isochronous or streaming real time data which occupies a prenegotiated amount of USB bandwidth with a pre-negotiated latency;

interrupt transfers: asynchronous interactive data such as characters or coordinates with human perceptible echo or feedback response characteristics, and;

bulk transfers: asynchronous block transfer data which is generated or consumed in relatively large and bursty quantities and has wide dynamic latitude and transmission constraints.

If there are no ongoing transactions, a USB system is in an Idle mode 101. Isochronous bus transactions including data transfer involve two stages, a Setup stage 102, and a Data stage 103. Isochronous bus transactions including data transfers involve the transmission of two different packets, e.g. a Token packet 104, 105 and a Data packet 106, 107. Isochronous transactions do not support a Status phase in which a Handshake packet is transferred or a retry capability.

Isochronous transactions may consist of IN transfers or OUT transfers. In the case of an IN transfer the USB host will start the transaction by sending an IN token 104. Upon receipt of the IN token 104, a USB device will return data in a Data packet 106. If, for example, owing to a bus error, the IN token 104 is not received by the USB device or is received corrupted, the USB device will not return a Data packet 106. This situation is indicated by line 108. After completion of the IN transfer the USB system returns to the Idle mode 101.

In the case of an OUT transfer the USB host will start the transaction by sending an OUT token 105. The USB host will subsequently send data in a Data packet 107. After completion of the OUT transfer the USB system returns to the Idle mode 101.

Figure 2:
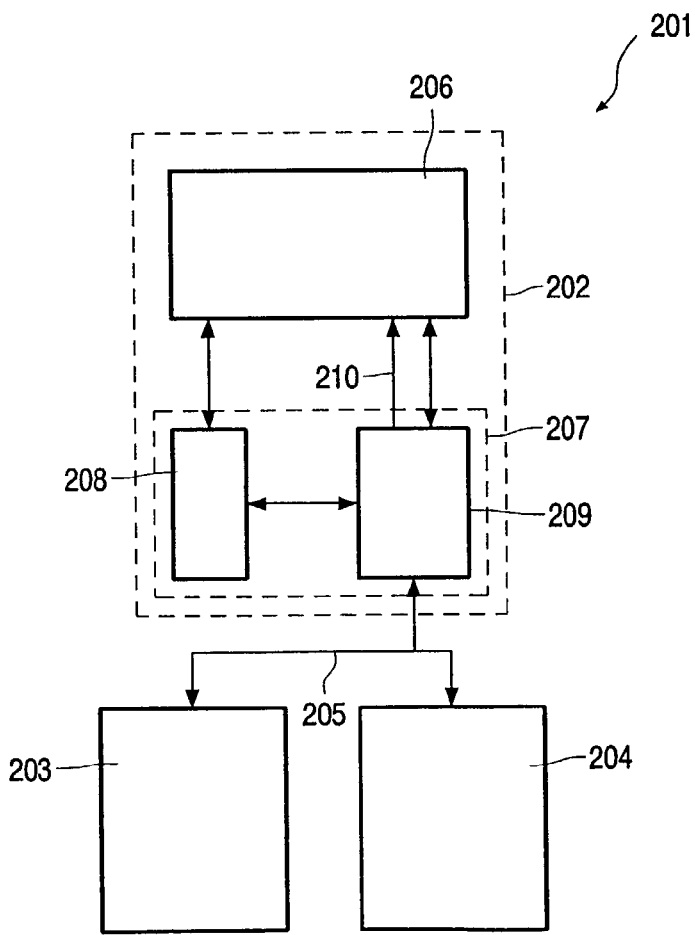
FIG. 2 is a block diagram showing a bus system according to the invention.

FIG. 2 is a block diagram showing a bus system according to the invention. The bus system 201 comprises a first station 202 acting as a USB host, and second stations 203 and 204 acting as USB devices. The stations 202, 203, 204 are coupled by bus connections 205. The first station 202 is shown in more detail. It comprises an interruptible processor 206 and a bus interface 207. The bus interface comprises a memory element 208 comprising a first buffer and a second buffer, and a controller 209. It is not necessary that the memory element 208 is part of the bus interface. In an alternative arrangement the memory element 208 could be placed within the first station 202, but outside the bus interface. Both the processor 206 and the controller 209 have access to the first and second buffers within the memory element 208. The controller is coupled to the bus connections 205. Furthermore, the controller 209 has an interrupt connection 210 to the processor 206.

Isochronous communication between the USB host 202 and a USB device 203, 204 is supported by the double buffering of data in the first buffer and the second buffer. Within the isochronous communication, data is sent periodically—every (micro) frame—from the USB host to the USB device 203, 204 or vice versa. This is illustrated by the following example in which isochronous data is transferred from the USB host 202 to the USB device 203, 204.

During a first interval of N (micro) frames, message properties of a first series of N messages are written by the processor 206 into the first buffer. These message properties comprise USB frame numbers and the payload of the messages. During a second interval of N (micro) frames directly following the first interval, the controller 209 retrieves the message properties from the first buffer and sends the first series of N isochronous messages. During the same interval the processor 206, triggered by an interrupt signal sent by the controller 209 via the interrupt output 210, writes message properties for a second series of N messages into the second buffer. During a third interval of N (micro) frames directly following the second interval, the controller 209 retrieves the message properties from the second buffer and sends the second series of N isochronous messages. During the same interval the processor 206, triggered by an interrupt signal sent by the controller 209 via the interrupt output 210, writes message properties for a third series of N messages into the first buffer. In further intervals this process continues, each time the controller 209 retrieves the series of N message properties, written by the processor 206 in the previous interval, from one buffer, while the processor 206, triggered by an interrupt signal sent by the controller 209 via the interrupt output 210, writes a new series of N message properties into the other buffer.

The duration N of each interval can be adjusted by the processor 206. To this end the processor 206 writes a control item comprising the duration N into a third data buffer. This data buffer may be part of the memory element 208 or it may be a register within the controller 209. In dependence upon the duration N stored in the third buffer the controller 209 adjusts the storage capacity of the first buffer and the second buffer such that each can store exactly N message properties. Any remaining memory space in the memory element 208 may be used for other purposes.

For example, if the value of N written into the control item is 4, then the processor 206 has to write a series of 4 message properties, including frame numbers and payload, into either the first buffer or the second buffer. The processor 206 has 4 milliseconds to respond to an interrupt signal sent by the controller 209 via the interrupt output 210 and to write the series of 4 message properties. In the same interval the controller generates and sends 4 isochronous messages from the previous series of messages properties written by the processor 206 into the other buffer.

It will be clear that in this way the controller 209 may co-operate with a variety of processors 206. For processors with a relatively long interrupt response time the value of N will be relatively great. For processors with a short interrupt response time the value of N will be relatively small. The minimum value of N equals 1.

Figure 3A:
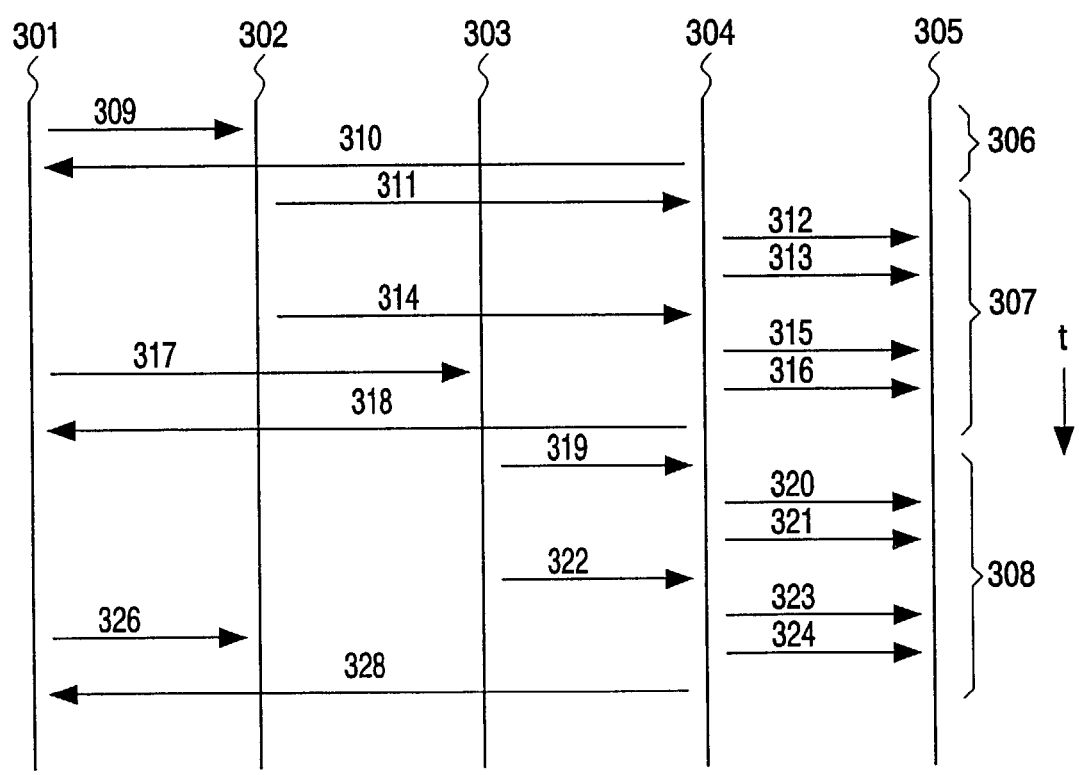
FIG. 3A is a message diagram showing transactions for data transmission.

FIG. 3A is a message diagram showing transactions for data transmission. The message diagram illustrates the operation of the system of FIG. 2 for isochronous transactions consisting of OUT transfers. Going top-down, time t increases. Information exchange between the processor 206 and the first buffer within the memory element 208 is symbolized by arrows between a first line 301 and a second line 302. Information exchange between the processor 206 and the second buffer within the memory element 208 is symbolized by arrows between the first line 301 and a third line 303. Information exchange between the processor 206 and the bus interface 207 is symbolized by arrows between the first line 301 and a fourth line 304. Information exchange between the first buffer of the memory element 208 and the bus interface 207 is symbolized by arrows between the second line 302 and the fourth line 304. Information exchange between the second buffer of the memory element 208 and the bus interface 207 is symbolized by arrows between the third line 302 and the fourth line 304. Information exchange between the bus interface 207 and the second station 203, 204 is symbolized by arrows between the fourth line 304 and a fifth line 305.

In a first period of time 306, the processor 206 writes a first series of message properties into the first buffer in a first write action 309. This first series of message properties comprises the properties for two isochronous USB transfers. The bus interface 207 subsequently sends an interrupt signal 310 to the processor 206.

In a second period 307 of time, the bus interface 207 retrieves the properties 311 of a first isochronous USB transfer from the first series of message properties stored in the first buffer. Then, in a first USB (micro) frame, the bus interface 207 sends an OUT token 312 to the second station 203, 204. The OUT token is followed by a Data packet 313. The bus interface 207 then retrieves the properties 314 of a second isochronous USB transfer from the first series of message properties stored in the first buffer. In a second USB (micro) frame the bus interface 207 now sends a second OUT token 315 to the second station 203, 204. This is followed by a second Data packet 316. In the meantime, in response to an interrupt signal 310, the processor 206 writes a second series of message properties into the second buffer in a second write action 317. This second series of message properties comprises the properties for two isochronous USB transfers. After sending the second Data packet 316, the bus interface 207 sends a second interrupt signal 318 to the processor 206.

In a third period of time 308, the bus interface 207 retrieves the properties 319 of a third isochronous USB transfer from the second series of message properties stored in the second buffer. Then, in a third USB (micro) frame, the bus interface 207 sends a third OUT token 320 to the second station 203, 204. The OUT token is followed by a third Data packet 321. Then the bus interface 207 retrieves the properties 322 of a fourth isochronous USB transfer from the second series of message properties stored in the second buffer. In a fourth USB (micro) frame the bus interface 207 now sends a fourth OUT token 323 to the second station 203, 204. This is followed by a fourth Data packet 324. In the meantime, in response to the second interrupt signal 318, the processor 206 writes a third series of message properties into the first buffer in a third write action 326. This third series of message properties comprises the properties for two isochronous USB transfers. After sending the second Data packet 316, the bus interface 207 sends a third interrupt signal 328 to the processor 206.

The message properties written into the first buffer and the second buffer comprise timing information in the form of USB (micro) frame numbers and a payload, the portion of the real-time data that should be in the frame being indicated by the (micro) frame number. Thus the bus interface 207 can handle the transfer without further actions being required on the part of the processor 206 for providing the real-time data. The communication between the processor 206 and the bus interface 207 is simplified in this way, since no additional communication link is required between the two for supplying the real-time data. Furthermore, no additional processing by the bus interface is required to assign the correct real-time data to the correct isochronous USB transfer.

It will be clear that communications as shown in FIG. 3A and as discussed above are merely illustrative examples designed to clarify the functioning of the bus system and that the functioning of the bus system is limited neither to the communications shown nor to the order in which these are shown.

Figure 3B:
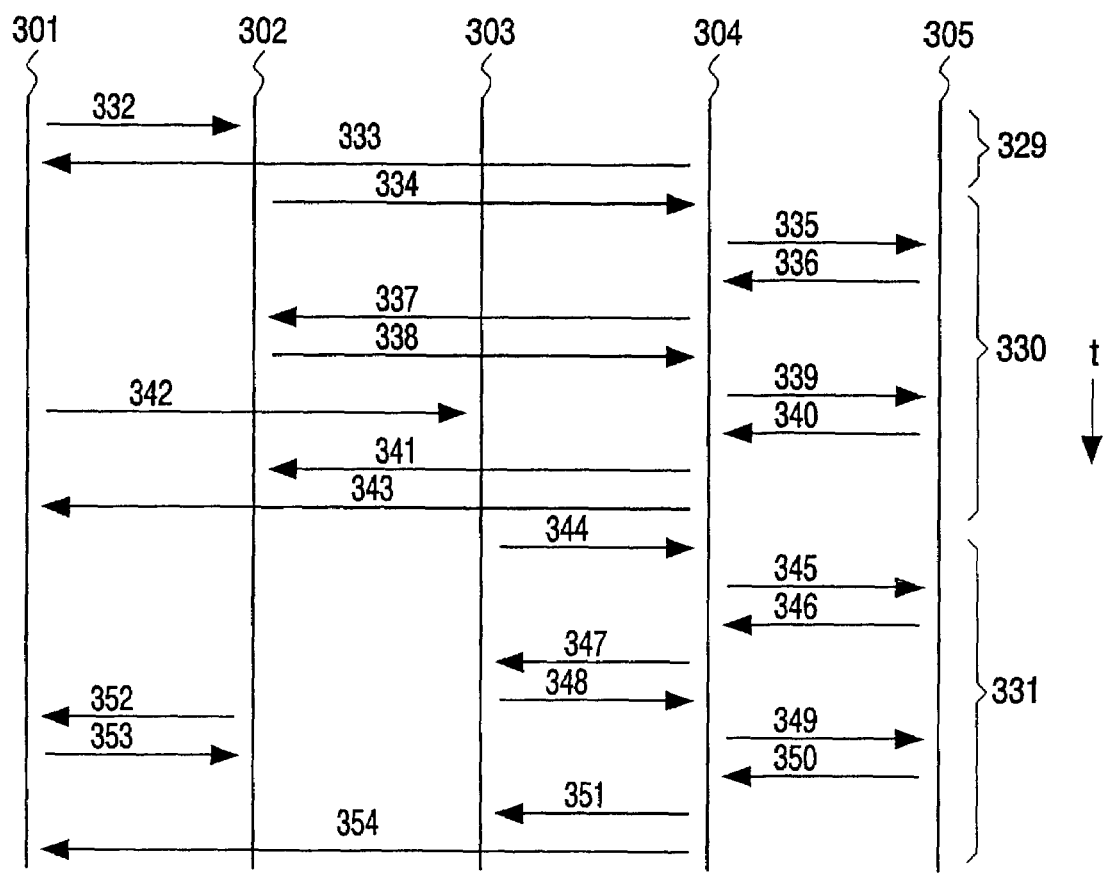
FIG. 3B is a message diagram showing transactions for data transmission.

FIG. 3B is a message diagram showing transactions for data transmission. The message diagram illustrates the operation of the system of FIG. 2 for isochronous transactions consisting of IN transfers. Going top-down, time t increases. Information exchange between the processor 206 and the first buffer within the memory element 208 is symbolized by arrows between a first line 301 and a second line 302. Information exchange between the processor 206 and the second buffer within the memory element 208 is symbolized by arrows between the first line 301 and a third line 303. Information exchange between the processor 206 and the bus interface 207 is symbolized by arrows between the first line 301 and a fourth line 304. Information exchange between the first buffer of the memory element 208 and the bus interface 207 is symbolized by arrows between the second line 302 and the fourth line 304. Information exchange between the second buffer of the memory element 208 and the bus interface 207 is symbolized by arrows between the third line 302 and the fourth line 304. Information exchange between the bus interface 207 and the second station 203, 204 is symbolized by arrows between the fourth line 304 and a fifth line 305.

In a first period of time 329, the processor 206 writes a first series of message properties into the first buffer in a first write action 332. This first series of message properties comprises the properties for two isochronous USB transfers. The bus interface 207 then sends an interrupt signal 333 to the processor 206.

In a second period of time 330, the bus interface 207 retrieves the properties 334 of a first isochronous USB transfer from the first series of message properties stored in the first buffer. Then, in a first USB (micro) frame, the bus interface 207 sends an IN token 335 to the second station 203, 204. The addressed USB device responds to the IN token 335 by sending a Data packet 336. In a first write action 337 of the bus interface 207, the data within the Data packet 336 is added as a payload to the first message properties from the first series of message properties stored in the first buffer. Then the bus interface 207 retrieves the properties 338 of a second isochronous USB transfer from the first series of message properties stored in the first buffer. Then, in a second USB (micro) frame, the bus interface 207 sends an IN token 339 to the second station 203, 204. The addressed USB device responds to the IN token 339 by sending a Data packet 340. In a second write action 341 of the bus interface 207, the data within the Data packet 340 is added as a payload to the second message properties from the first series of message properties stored in the first buffer.

The bus interface 207 now sends a second interrupt signal 343 to the processor 206. In the meantime, in response to the interrupt signal 333, the processor 206 writes a second series of message properties into the second buffer in a second write action 342. This second series of message properties comprises the properties for two isochronous USB transfers.

In a third period of time 331, the bus interface 207 retrieves the properties 344 of a third isochronous USB transfer from the second series of message properties stored in the second buffer. Then, in a third USB (micro) frame, the bus interface 207 sends an IN token 345 to the second station 203, 204. The addressed USB device responds to the IN token 345 by sending a Data packet 346. In a third write action 347 of the bus interface 207, the data within the Data packet 346 is added as a payload to the first message properties from the second series of message properties stored in the second buffer. Then the bus interface 207 retrieves the properties 348 of a fourth isochronous USB transfer from the second series of message properties stored in the second buffer. Then, in a second USB (micro) frame, the bus interface 207 sends an IN token 349 to the second station 203, 204. The addressed USB device responds to the IN token 349 by sending a Data packet 350. In a fourth write action 351 of the bus interface 207, the data within the Data packet 350 is added as a payload to the second message properties from the second series of message properties stored in the first buffer. The bus interface 207 thereupon sends a second interrupt signal 354 to the processor 206. In the meantime, in response to interrupt signal 333, the processor 206 reads the first series of message properties stored in the first buffer in a first read action 352. These message properties now include, as a payload, the data sent by the addressed USB device in Data packets 336 and 340. Then the processor 206 writes a third series of message properties into the first buffer in a third write action 342. This third series of message properties comprises the properties for two isochronous USB transfers.

It will be clear that communications as shown in FIG. 3B and as discussed above are merely illustrative examples designed to clarify the functioning of the bus system and that the functioning of the bus system is limited neither to the communications shown nor to the order in which these are shown.

Figure 4:
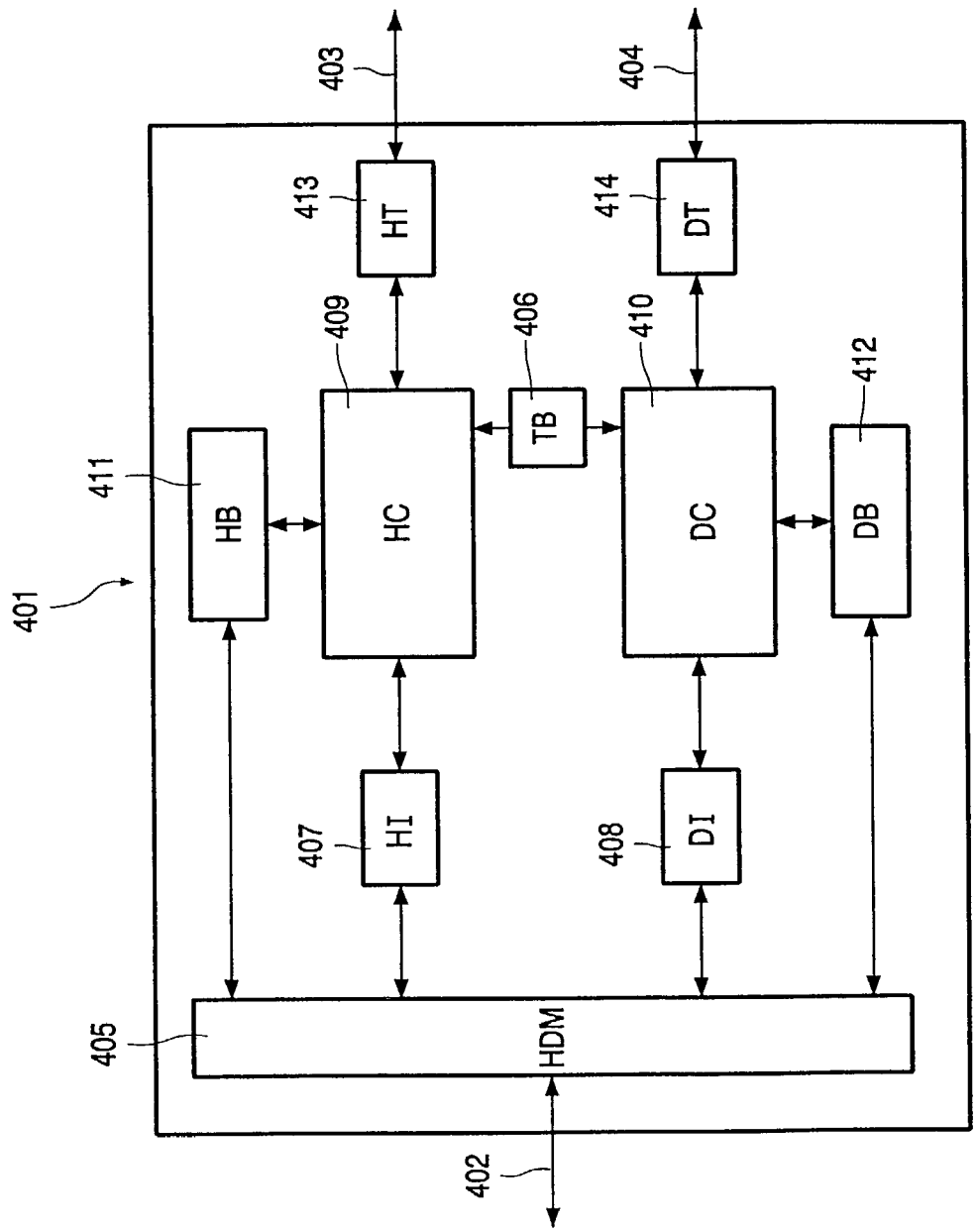
FIG. 4 is a block diagram showing a bus interface according to the invention.

FIG. 4 is a block diagram showing a bus interface according to the invention. The block diagram shown in the Figure is a block diagram of a bus interface integrated circuit. The bus interface integrated circuit 401 has a dual role. It can be part both of a bus station acting as a USB device and of a bus station acting as a USB host. This is especially useful in a USB On-The-Go (OTG) apparatus. Such a USB OTG apparatus may be, for example, a digital still camera, a digital video camera, a personal digital assistant, or an oscilloscope, which in a certain mode of operation is connected via USB to, for example, a mass storage apparatus (e.g. a hard disk drive, optical recorder, or solid state recorder), a printer, or a cellular phone. In this mode of operation the USB OTG apparatus should act as a USB host. In another mode of operation the USB OTG is connected via USB to, for example, a personal computer. In this mode of operation the USB OTG apparatus should act as a USB device. The mode in which the bus interface integrated circuit of the USB OTG apparatus operates may be software-determined and controlled by a processor within the USB OTG apparatus.

If the USB OTG apparatus is portable, it may be advantageous to include a low-power consumption mode available in which the bus interface integrated circuits shuts down certain functional blocks or operates at a lower clock speed in time periods of, for example, low bus traffic or no bus traffic at all. Such a low power consumption mode could be enhanced by including a so-called remote wake-up feature, controlled by the processor of the USB OTG apparatus to bring back to operation certain or all functional blocks or to increase the clock speed of the bus interface integrated circuit. The remote wake-up feature could be activated, for example, if the processor anticipates increased bus traffic.

The bus interface integrated circuit 401 comprises a connection 402 to an processor, a connection 403 for connection to a USB should the bus interface integrated circuit 401 operate as a USB host, and a connection 404 for connection to a USB should the bus interface integrated circuit 401 operate as a USB device. Note that in a practical implementation connections 403 and 404 may share the same I/O terminals, while an internal multiplexer takes care of the internal routing of the bus signals. Such an implementation may be advantageous if it is guaranteed that connections 403 are not used simultaneously.

The bus interface integrated circuit 401 further comprises a host-device multiplexer 405, a timing block 406, a host interface 407, a device interface 408, a host controller 409, a device controller 410, a host memory element 411, a device memory element 412, a host transceiver 413, and a device transceiver 414.

The host-device multiplexer 405 is connected to the connection 402 with the processor. It determines the internal routing of the communication of the bus interface integrated circuit 401 with the processor, preferably under control of the processor. If the bus interface integrated circuit 401 operates as a USB host, the host-device multiplexer 405 links the host controller 409 via the host interface 407 to the processor. If the bus interface integrated circuit 401 operates as a USB device, the host-device multiplexer links the device controller 410 via the device interface 408 to the processor. The host controller 409 has access to the bus connection 403 via the host transceiver 413. The device controller 410 has access to the bus connection 404 via the device transceiver 414.

The host memory element 411 can be accessed both by the host controller 409 and, via the host-device multiplexer 405, by the processor. It may be used, for example, for storing request properties issued by the processor and for storing results of the communication between the host controller 411 and a USB device.

The device memory element 412 can be accessed both by the device controller 410 and, via the host-device multiplexer 405, by the processor. It may be used, for example, for buffering data generated by the processor, which should be sent to a USB host.

To support co-operation between the bus interface integrated circuit and a wide range of processors, the host memory element 411 and the device memory element 412 are preferably accessible to the processor in both a direct memory access (DMA) mode and a parallel input-output mode.

It is advantageous to support several ways of communication between the processor and the memory elements within the bus interface interface integrated circuit 401. This results in a wider choice of processors. For example, a more sophisticated computing system will support DMA operation. If the bus interface also supports DMA operation, the communication overhead of the processor is further reduced. In a less sophisticated bus station, on the other hand, the processor handles all communication without the support of a DMA controller. In such a situation the bus interface needs to support data exchange between the bus interface and the processor in a parallel input-output mode.

Although the embodiment discussed above relates to a bus interface integrated circuit, it will be clear to those skilled in the art that different blocks or groups of blocks within the diagram could be embodied in different integrated circuits and discrete components. Thus alternative embodiments relating to the bus interface described by the block diagram could comprise a plurality of integrated circuits and discrete components performing the functions of the various blocks.

Depending on the requirements of the bus system, it is advantageous to realize the bus interface as an integrated circuit. The functional integration in an integrated circuit enables a reduction in component count and an area minimization and will thus result in a reduction in physical size of a bus station comprising the bus interface. Furthermore, realizing the bus interface as an integrated circuit will lead to a reduction in power consumption.

Depending on the requirements of the bus system, it is advantageous to realize the bus interface with a plurality of integrated circuits and discrete electronic components, utilizing standard building blocks as much as possible. This reduces the cost price of the bus interface.

Figure 5:
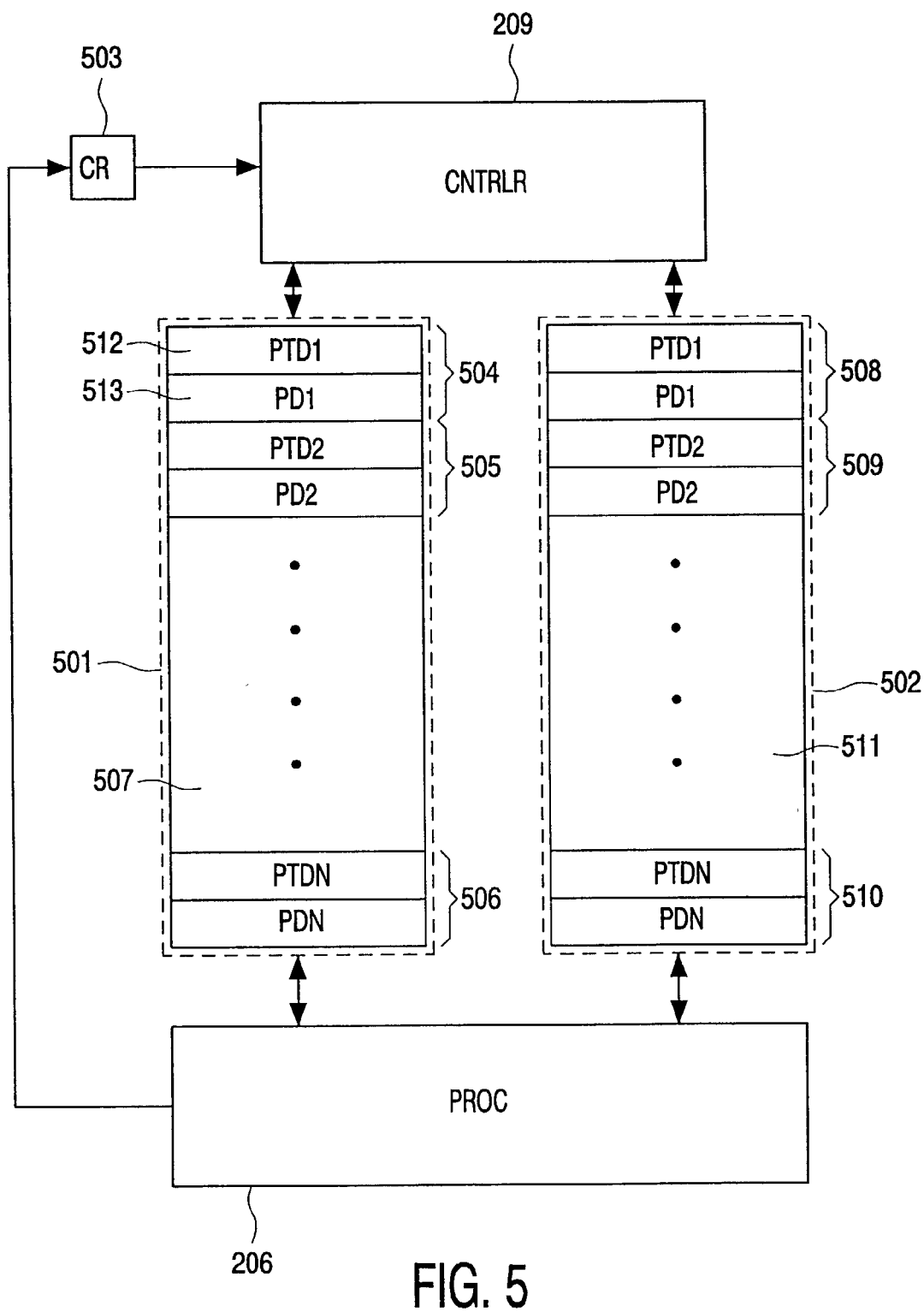
FIG. 5 is a block diagram showing the communication between a controller and a processor within a first station of the bus system.

FIG. 5 is a block diagram showing the communication between a controller and a processor within a first station of the bus system. The block diagram shows the controller 209, the processor 206, a first buffer 501 and a second buffer 502, and a third buffer 503 for storing a control item that determines the storage capacity of the first buffer 501 and the second buffer 502. Before the processor 206 starts writing series of message properties into the first buffer 501 and the second buffer 502, the processor writes a value N, the number of message properties each series will contain, into the third buffer 503. The controller 209 retrieves this value N from the third buffer and adjusts the storage capacity of the first buffer 501 and the second buffer 502 accordingly.

Within the first buffer 501, 504 symbolically denotes the location of the first message properties of a series, 505 the location of the second message properties of the same series, and 506 the location of the last, the Nth, message properties of the same series. 507 symbolically denotes the locations of the remaining message properties of the same series.

Within the second buffer 502, 508 symbolically denotes the location of the first message properties of a second series, 509 the location of the second message properties of the same series, and 510 the location of the last, the Nth, message properties of the same series. 511 symbolically denotes the locations of the remaining message properties of the same series.

The message properties are divided into two parts, a transfer descriptor or header 512, and payload or data 513. In the case of OUT transfers, the payload 513 is the data that should be included in the Data packets to be sent from the USB host to the addressed USB device. In an IN transfer, the payload 513 is initially empty space that is later on filled with the data contained in the Data packets sent by the addressed USB device. The transfer descriptor is also used by the controller 209 to store the results of transactions. For these reasons both the processor 206 and the controller 209 need to have read and write access to the first buffer 501 and the second buffer 502.

The table below shows a format of the transfer descriptor. The shown format consists of 8 bytes, indicated as Byte 0, Byte 1, ..., Byte 7. Every byte consists of 8 bits, numbered from 0, 1, ..., 7.

|   | 7 | 6 | 5 | 4 | 3 | 2 | 1 | 0 |
|---|---|---|---|---|---|---|---|---|
| Byte 0 | Actual bytes (7:0) | | | | | | | |
| Byte 1 | Completion code | | | Active | Toggle | Actual bytes (9:8) | | |
| Byte 2 | MaxPktSize (7:0) | | | | | | | |
| Byte 3 | Endpoint number (3:0) | | | | Last | Speed | MaxPktSize (9:8) | |
| Byte 4 | Total bytes (7:0) | | | | | | | |
| Byte 5 | 0 | 0 | Res | Res | Dir. token (1:0) | | Total bytes (9:8) | |
| Byte 6 | 1 | Device address | | | | | | |
| Byte 7 | Starting frame number (7:0) | | | | | | | |

The table below clarifies the meanings of the parameters in the table above.

| Name | Length (bits) | Description |
|---|---|---|
| ActualBytes | 10 | Contains the number of bytes that were transferred |
| Completion code | 4 | Indicates how the last transaction for the relevant transfer descriptor was completed, including occurrence of errors |
| Active | 1 | Indicates whether or not transactions should be executed |
| Toggle | 1 | Used to generate or compare the data PID value. It is updated after each successful transmission or reception of a Data packet |
| MaxPktSize | 10 | Indicates the maximum number of bytes that can be sent to or received from the relevant endpoint in a single Data packet |
| Res | 1 | not used |
| Speed | 1 | Indicates the speed of the relevant endpoint |
| TotalBytes | 10 | Indicates the total number of bytes to be transferred |
| Dir. token | 2 | Indicates whether the transfer descriptor relates to IN transfers or OUT transfers |
| Device address | 7 | Indicates the address of the USB device that should be addressed |
| Starting frame number | 8 | Indicates at which time the isochronous packet should be sent |

The invention claimed is:

1. A bus system including a first station and a second station, coupled by a bus for transferring messages, said bus being designed to operate in accordance with a protocol in which said first station periodically sends messages in a predetermined order to the second station, characterized in that
said first station includes an interruptible processor, a memory element comprising a buffer, and a bus interface,
wherein said interruptible processor can be operated so as to generate a plurality of series of message properties where the message properties include timing information and further include a payload;
wherein said processor can further be operated so as to issue a first series of message properties from among said plurality of series of message properties to said buffer, and upon receipt of an interrupt signal from said bus interface to issue a second series of message properties from among said plurality of series of message properties;
wherein said buffer has a storage capacity that is adjustable by the processor such that it is matched to store said first series of said message properties and said second series of said message properties;
wherein said bus interface can be operated so as to retrieve said first series of message properties from said buffer, to generate a first series of said messages properties from said message properties, to send said first series of said messages to said second station, and to send interrupt signal to said processor;
said bus interface can be operated for periodically receiving messages with data items from the second station;
said bus interface can be further operated so as to extract said data items from said received messages, to extract timing information from said received messages, to compare said timing information with said timing information of said message properties from said first series of message properties stored in said buffer, and if said extracted timing information matches the timing information of said message properties from said first series of message properties stored in said buffer, to add said extracted data items to said payload; and
said processor can be operated so as to retrieve said payload from said message properties from said first series of message properties stored in said buffer upon receipt of a further interrupt signal from said bus interface.

2. A bus interface including a connection for a bus, an input for receiving a plurality of series of message properties from an interruptible processor, and an interrupt output for sending an interrupt signal to said processor, comprising:
a controller;
a memory element comprising a buffer, wherein said buffer has a storage capacity which is adjustable by said processor and which is matched so as to store a first series of said message properties from among said plurality of series of message properties received from said processor and a second series of said message properties from among said plurality of series of message properties received from said processor after said processor has received an interrupt signal via said interrupt output,
wherein said controller can be operated so as to retrieve said first series of message properties from said buffer, to generate a first series of message properties from said first series of said message properties, to send said first series of message properties to said connection for said bus, and to send said interrupt signal to said processor; and a further buffer that can be operated so as to receive a storage capacity control item from said processor; and said controller can be operated so as to retrieve said storage capacity control item from said processor, and to retrieve said storage capacity control item from said further buffer and, based on information contained within said storage capacity control item, can be operated so as to adjust said storage capacity.

3. A bus interface including a connection for a bus, an input for receiving a plurality of series of message properties from an interruptible processor, and an interrupt output for sending an interrupt signal to said processor, comprising:

a controller; and a memory element including a buffer, wherein said buffer has a storage capacity which is adjustable by said processor and which is matched so as to store a first series of said message properties, where the message properties include timing information on said messages and further include a payload of said messages, from among said plurality of series of message properties received from said processor and a second series of said message properties from among said plurality of series of message properties received from said processor after said processor has received an interrupt signal via said interrupt output, wherein said controller can be operated so as to retrieve said first series of message properties from said buffer, to generate a first series of message properties from said first series of said message properties, to send said first series of message properties to said connection for said bus, and to send said interrupt signal to said processor, said controller can be operated for periodically receiving messages with data items from the second station;

said controller can further be operated so as to extract said data items from said received messages, to extract timing information from said received messages, to compare said timing information with said timing information of said message properties from said first series of message properties stored in said buffer, and if said extracted timing information matches said timing information of said message properties from said first series of message properties stored in said buffer, to add said extracted data items to said payload; and wherein a further interrupt signal is sent via said interrupt output to said processor to notify said processor of said addition of said extracted data items to said payload.

* * * * *